(No Model.)

W. S. CRANE & A. EDEN.
CRACKER MACHINE.

No. 339,972. Patented Apr. 13, 1886.

Attest:
John Schuman.
A. Sprague

Inventors:
Alfred Eden,
William S. Crane
by Atty
Thos. L. Sprague

UNITED STATES PATENT OFFICE.

WILLIAM S. CRANE AND ALFRED EDEN, OF DETROIT, MICHIGAN.

CRACKER-MACHINE.

SPECIFICATION forming part of Letters Patent No. 339,972, dated April 13, 1886.

Application filed June 25, 1885. Serial No. 169,750. (No model.)

*To all whom it may concern:*

Be it known that we, WILLIAM S. CRANE and ALFRED EDEN, of Detroit, in the county of Wayne and State of Michigan, have invented new and useful Improvements in Cracker-Machines; and we do hereby declare that the following is a full, clear, and exact description thereof, reference being had to the accompanying drawings, which form a part of this specification.

This invention relates to a new and useful improvement in cracker-machines of that kind usually known as a "cutting and scrapping machine;" and the invention consists in an improved device for removing the scrap, all as more fully hereinafter described.

Figure 1:
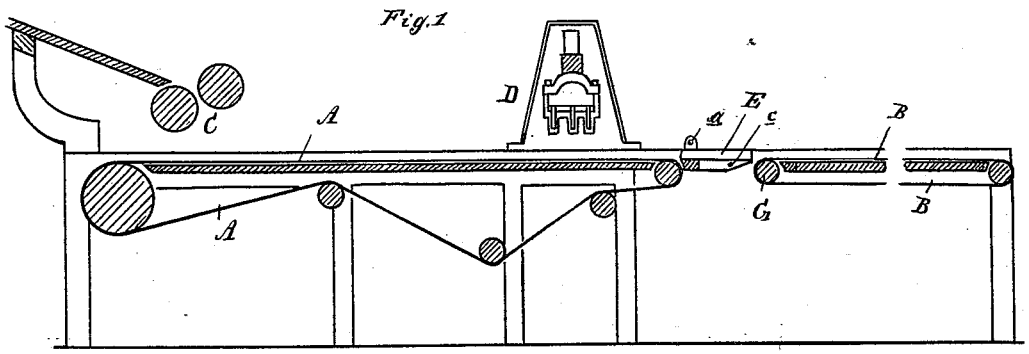
Figure 2:
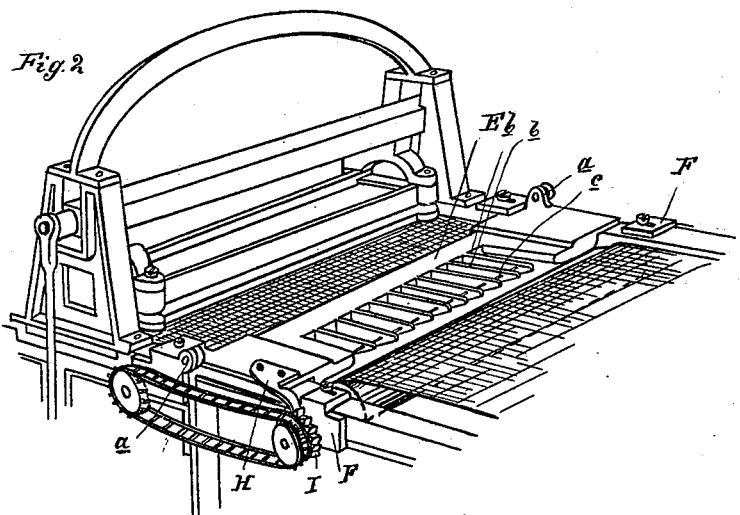
Figure 3:
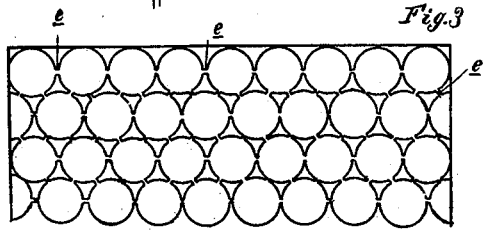

In the drawings which accompany this specification, Figure 1 is a vertical central longitudinal section of our improved cracker-machine. Fig. 2 is a detached perspective view of the improved scrapping device. Fig. 3 is a diagram showing the impress of the cutter in the sheet of dough.

The machine shown in the drawings is of known construction and operation, except as hereinafter specified.

The machine has two aprons, A B, upon which the sheet of dough is carried from the rolls C, which form the sheet, to the peel end of the table. The apron A carries the blanket of dough under the vertically-reciprocating cutter-head D, and passes it onto a bridge, E, which occupies an interval left between the two aprons. The apron B receives its motion from the apron A by means of a suitable sprocket-wheel and chain-connection between their adjoining rolls. This bridge E is shown in perspective in Fig. 2. It is hinged at *a a* to the frame of the machine with its upper face in the plane of the aprons, and that portion of it over which the sheet of dough passes is perforated. The nature and form of these perforations depend upon the article the machine is intended for, as their object is to allow the scrap to fall through without disturbing the sheet of crackers or biscuits. We preferably form this bridge in the shape of a finger-bar, with the series of fingers *b b* extending rearwardly in the direction of the apron, and with suitable spaces to allow the scrap to fall through. One or more scraper-rods, *c*, are secured crosswise through the fingers *b*, a little below the upper face thereof.

H is an arm secured to one end of the bridge and engaging with its free end upon a ratchet-wheel, I, which latter is secured to or connected with a movable part of the machine, so that in operation it will communicate to the bridge a vertical shake around its pivots.

It is obvious that the cutters employed in connection with this scraping device must be of that kind which leave the scrap in disconnected sections in the sheet, as shown in Fig. 3, wherein *e e* are the sections cut out by the cutters, and which have to be removed to obtain the crackers free from scrap.

In practice it will be seen that as the sheet of dough passes from under the cutters onto the bridge the shaking motion of the latter will shake out the scrap, which falls below, while the sheet of crackers passes unbroken onto the apron B, which forms the peel end of the machine. Such pieces of scrap which are only partially detached will hang down between the fingers, and are scraped off by the rod *c*.

The bridge E is removably secured in place, so as to admit of its ready removal when the machine is to be used for making other stock, in which case an imperforate bridge is inserted in its place.

The roll G, which communicates motion to the apron B, may be journaled in sliding bearings F, so that by lengthening the apron and adjusting these bearings F the gap between the two aprons may be closed up after removing the scrapping-bridge, in which case a much smaller bridge would fill the gap left between the two aprons.

Instead of providing the scrapping-bridge with a shaking motion, an air-blast may be used to blow the pieces of scrap through the perforations of the bridge; but we deem the former arrangement preferable.

Wherever we use the word "separator" or "bridge" in the following claims, we wish to be understood as meaning a perforated or fingered bridge onto which the crackers and scraps pass to separate the same.

What we claim as our invention is—

1. In a cracker-machine, a perforated bridge arranged in the path of the sheet of dough between the cutters and the peel end of the machine, and constructed and operated to form a scrapping device, substantially as described.

2. In a cracker-machine, two aprons to carry the dough, a perforated bridge arranged in the path of the sheet of dough between the cutters and the peel end of the machine and between said aprons, and constructed and operated to form a scrapping device, as set forth.

3. In a cracker-machine, a hinged and perforated separator combined with the carrier for the dough and means for shaking said separator, as set forth.

4. In a cracker-machine, the hinged and perforated bridge E, in combination with a shaking device, as the arm H and ratchet I, substantially as described.

5. In combination with the carrier-aprons A B, separated by an intervening gap, the perforated bridge E, removably secured in position and forming the path across said intervening gap, substantially as described.

6. The combination, with the carrier A, of the perforated bridge E, and means, substantially as described, for separating the scraps from the crackers as the same pass over said bridge, as set forth.

7. The combination, with the carrier-apron A, of the apron B, supported at one end in movable bearings, and a separator for separating the scraps from the crackers, removably secured between said aprons, substantially as and for the purpose specified.

8. In a cracker-machine, the combination, with the apron A, of the bridge E, provided with fingers b, substantially as and for the purposes specified.

9. In a cracker-machine, a scrapping device consisting of the bridge E, having fingers b and hinges a, the arm H, and the ratchet-wheel I, all combined and operating as described.

10. In combination with the bridge E, having fingers b, the scraper-rod c, secured crosswise between said fingers, substantially as and for the purpose specified.

WILLIAM S. CRANE.
ALFRED EDEN.

Witnesses:
JOHN H. VAIL,
JOHN E. KEATING.